METHOD OF PRODUCING A MUSCULARLY BALANCED CLOSURE OF THE HUMAN MANDIBLE

Original Filed Sept. 5, 1969 2 Sheets-Sheet 1

INVENTOR.
BERNARD JANKELSON
BY Seed, Berry & Dorey
ATTORNEYS

INVENTOR.
BERNARD JANKELSON
BY Fred Berg, Downey
ATTORNEYS

United States Patent Office

Re. 27,847
Reissued Dec. 18, 1973

27,847

METHOD OF PRODUCING A MUSCULARLY BALANCED CLOSURE OF THE HUMAN MANDIBLE

Bernard Jankelson, 1451 Medical Dental Bldg., Seattle, Wash. 98101

Original No. 3,593,422, dated July 20, 1971, Ser. No. 855,480, Sept. 5, 1969. Application for reissue Feb. 14, 1972, Ser. No. 225,722
Int. Cl. A61c 9/00
U.S. Cl. 32—21 17 Claims

Matter enclosed in heavy brackets [ ] appears in the original patent but forms no part of this reissue specification; matter printed in italics indicates the additions made by reissue.

ABSTRACT OF THE DISCLOSURE

Mandibular closure is produced by simultaneous and even electrical programmed stimulation of the motor nerves controlling the masticatory and facial muscles. The resultant involuntary closure of the mandible is independent of the volition of the patient or the manual guidance of the dentist. The method and techniques associated therewith are useful in a number of clinical and diagnostic techniques.

BACKGROUND OF THE INVENTION

Field of the Invention

This invention relates to a method for stimulating the muscle complex that works synergistically to close the human mandible by an electrical current.

PRIOR ART RELATING TO THE DISCLOSURE

In fitting dentures and in correcting occlusional difficulties of patients the dentist has been forced to rely on methods and techniques for (1) determining the myocentric position of occlusion, (2) determining the vertical position of occlusion and (3) taking denture impressions, which are time consuming, less than certain, confusing to the patient and many times frustrating for the dentist. Balanced simultaneous action of the muscle groups involved in opening and closing the mandible is not possible by voluntary action on the part of the patient as voluntary closure is subject to deviation from the myocentric position of occlusion by existing unilateral contracture or spasms, by proprioception of deflective areas on teeth or biterims or by shifting denture bases. The dentist has not had any technique available by which to cause the mandible to repeatedly and accurately close to the myocentric position of occlusion. Further there has not been any technique available to the dentist to accurately determine the vertical position of occlusion for each individual patient, to diagnose the comparative degree of relaxation or contracture of the muscle groups on each side of the face or to take dental impressions without manipulation of the impression tray by the dentist or voluntary closure by the patient.

An article by Henry S. Brenman and Morton Amsterdam entitled "Postural Effects On Occlusion," Dental Progess, Volume 4, Number 1, 1963, pages 41 to 51, discusses jaw closure caused by "electrical stimulation through disc electrodes placed at the motor points of the paired masseter muscles." Only the paired masseter muscles were stimulated. The paper was the result of experimental efforts to determine the effects of various postural positions on occlusion. The technique employed is not and was not intended to be a clinical technique. The research indicated an alteration of cuspal activity with a change in body position and intimated that involuntary stimulation of the muscles would not be useful as a clinical technique.

SUMMARY OF THE INVENTION

The invention relates to a method of closing the human mandible by stimulating, from their relaxed position, simultaneous group action of all the masticatory and facial muscles by an electrical current, and particularly to the method of producing a muscularly balanced closure of the human mandible by simultaneously and evenly stimulating the motor roots of the mandibular and facial nerves on both sides of the face. Input electrodes are placed in intimate contact with the skin on both sides of the face directly over the manidbular notch to stimulate the motor roots of the mandibular and facial nerves. A number of diagnostic and clinical techniques are possible by electrical programmed stimulation of the motor nerves controlling the masticatory and facial muscles.

DETAILED DESCRIPTION OF THE DISCLOSURE

Opening and closing of the human lower jaw or mandible is performed by a large number of muscles that are activated through the motor roots of the fifth (mandibular) and seventh (facial) cranial nerves, this group of muscles being known as the masticatory and facial muscles. The muscles complex works synergistically to close the mandible. It is important that the muscle complex be stimulated as a group and not individually for the purposes described herein, and also that the muscles be stimulated from their relaxed position. There are two sets of muscles, one on the right and one on the left side of the face. If only one muscle group contracts, the mandible will deviate to that side as it closes. For smooth physiologic closure to occlusion, the entire muscle complex of each side must contract simultaneously in group action.

The muscle complex referred to above is innervated by the motor branch of the fifth and seventh cranial nerves. The mandibular or fifth cranial nerve innervates the following muscles: masseter, posterior and anterior temporal, internal pterygoid, external pterygoid, anterior belly of the digastric, mylohyoid, buccinator, outer fascie of buccinator, and the muscles of the upper and lower lips. The facial or seventh cranial nurve innervates the following muscles: occipital, auricular, platysma, stapedius, posterior belly of the digastric, stylohyoid, buccinator, resorius, orbicularis oris and the muscles of the upper lips and nose. By stimulating the motor roots of the fifth and seventh cranial nerves on both sides of the face from their relaxed positions simultaneously and evenly, muscularly balanced closure of the mandible is possible.

Figure 1:
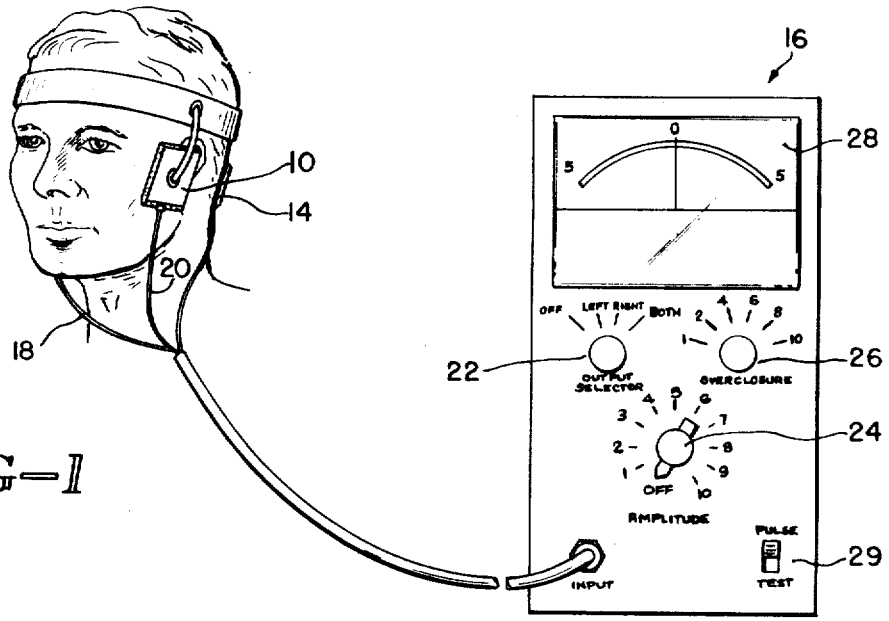
FIG. 1 is a perspective view of the human head showing the position of the input electrodes on each side of the face.

Referring to FIG. 1 input electrodes 10 and 12 are placed on each side of the face as shown and a common dispersal electrode 14 placed in contact, preferably, with the skin adjacent the cervical spine. The electrodes are connected to a pulse generator 16 by lead wires 18 and 20.

Figure 2:
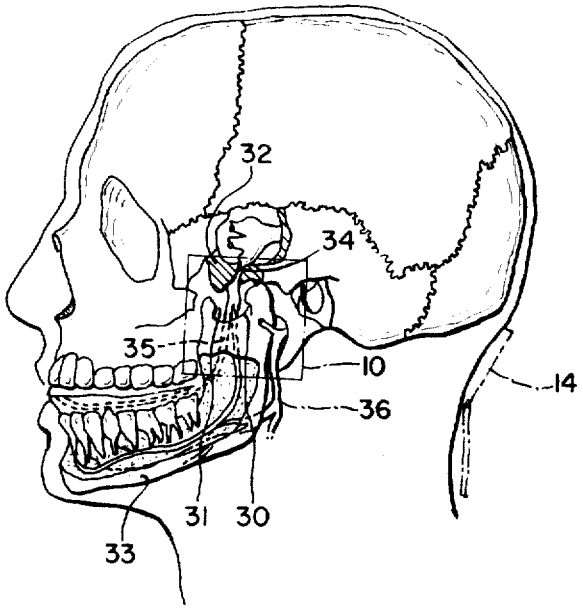
FIG. 2 is a cross-sectional view of the human head showing in phantom the position of the input electrodes and their relation to the motor roots of the mandibular and facial nerves.
Figure 3:
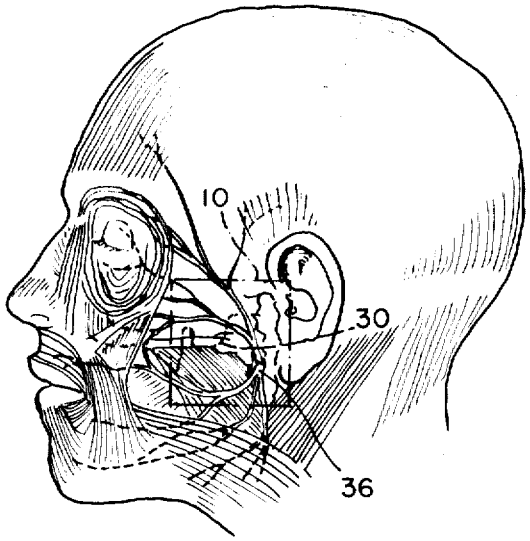
FIG. 3 is a side view of the human head illustrating the facial nerve, its position relative to the ear lobe, and its branches to the various mucles of the face and mandible.
Figure 4:
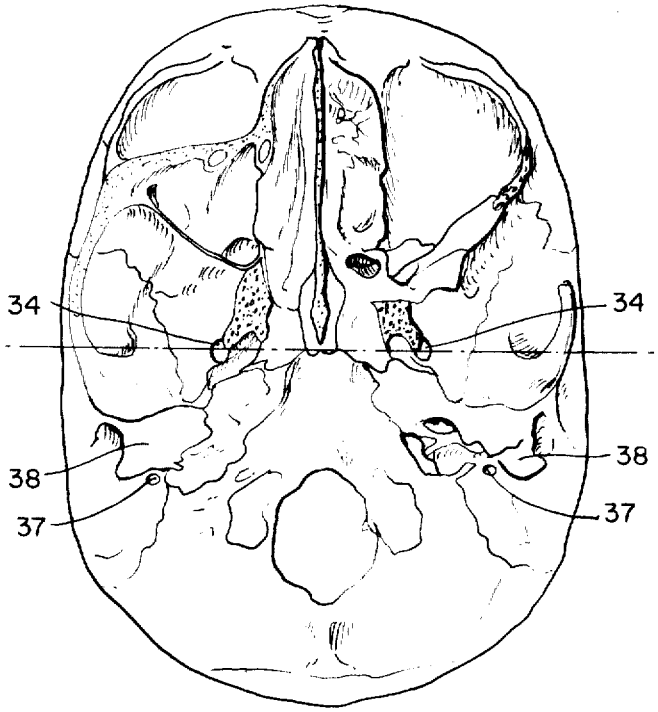
FIG. 4 is a view of the base of the human skull cut to show roofs of the right maxillary and left ethmoidal sinuses.

Controls for the pulse generator are located in the front of the housing of the generator. The output selector 22 controls delivery of current through the left, right or both input electrodes. The amplitude selector 24 controls the intensity of current delivered through the input electrodes, the current being pulsed at a particular rate, usually 40 pulses/minute. The voltage used is in the range of 10 to 35 volts at relatively low milliamperage. The overclosure selector 26 controls the intensity of current delivered through the input electrodes at a higher pulse rate, usually 110 pulses/minute. The over-closure control functions separately from the amplitude control. A milliampere meter 28 is operatively connected to a test circuit controlled by selector 29 to determine the current flow from each of the input electrodes to the common dispersal electrode. The necessity of doing this will be explained in detail. According to this invention the fifth and seventh cranial nerves are stimulated by an electrical current flowing through input electrodes 10 and 12 placed on each side of the face to the nerves and out through a common disposal electrode placed, preferably, over the cervical spine. Placement of the input electrodes is important for simultaneous and even stimulation of the fifth and seventh cranial nerves. FIGS. 1, 2 and 3 show the placement of the input electrodes. In general they are placed directly over the mandibular notch on each side of the face and contiguous to the lower lobe of the ear. Referring to FIG. 2 the posterior edge of the coronoid process 30 forms the anterior border of the mandibular notch 31 and limits in front the interval lift between the lower border of the posterior path of the zygomatic arch 32 and the upper hollowed edge of the ramus 33. Looking from one mandibular notch the floor of the infra-temporal fossa, or base of the skull (not shown) may be seen. Posteriorly it is possible to pass a probe across the base of the skull from one mandibular notch to the other, the shaft of the probe crossing the foramina ovalia 34 through which the fifth mandibular cranial nerve 35 passes. FIG. 4 shows in greater clarity the foramina ovalia through which the fifth cranial nerves pass. The motor point of the seventh facial or cranial nerve 36 is just ahead of the lower ear lobe. The facial nerve as can be seen in FIG. 3 (see FIG. 4), descends under cover of the styloid process 38 and continues down between the styloid process and the posterior belly of the digastric muscle (not shown).

It is clinically important that contraction of the nerve fibers be effected through the motor nerves rather than by individual stimulation of the muscles per se. By stimulating the motor nerves the entire muscle complex is stimulated. The number of electrodes needed to stimulate the muscle complex directly is so great that it is impractical. In addition stimulation through the motor nerves is much more efficient in relation to the amount of electric current necessary to cause muscle contraction than is stimulation of the muscle directly. The amount of electrical current necessary to stimulate nerves is known to be six to eight times less than that required to stimulate muscle directly. For normal operation the nerves described are stimulated throughout their entire excitation range from threshold stimulus to full contraction, the threshold stimulus being defined as the smallest amount of current necessary to produce a slight twitch.

Placement of the input electrodes, as has been mentioned, is important. It is likewise important that the nerves on each side of the face be stimulated simultaneously and at the same intensity. To insure that the current delivered to each of the electrodes is equal, the current from the pulse generator to each electrode emanates from the same terminal. The amount of stimulus transferred from the input electrodes to the motor nerves through each side of the face depends on skin resistance. To determine whether the current flowing through the tissues and skin is bilaterally equal the relative impedance of the current passing from the input electrodes on each side of the face of the common dispersal electrode is measured by disconnnecting the pulsing current delivered to the input electrodes and applying a 1.5-volt DC current across the electrodes and measuring by milliampere meter 28 the current flow from each input electrode to the dispersal electrode.

The electrical stimulus is delivered through each of the input electrodes through the skin to the nerves repetitively. The duration and number of pulses delivered is that which is optimum for the stimulation of muscle repeatedly without fatigue. The intermittent or pulsing current used has a duration of about 2 milliseconds and a frequency of about 40 pulses/minute, the duration approximating that of natural stimuli and the frequency below that which would cause muscle exhaustion. Variations from these preferred standards are possible, however.

The above described method for simultaneously and bilaterally stimulating group action of all the masticatory and facial muscles can be used in a number of clinical and diagnostic techniques by the dentist, some of which will be described in some detail. For example, the method can be used (1) to diagnose the comparative degree of relaxation or contracture of the muscle groups on each side of the face, (2) to cause the mandible to close to the horizontal myocentric position of occlusion, (3) to determine the vertical position of occlusion, (4) to take denture impressions, (5) to relax muscle spasms associated with Temporomandibular Joint Syndrome, and (6) to reduce postoperative swelling and discoloration by causing gentle massage as the muscles contract.

(1) Diagnosis of the comparative degree of relaxation or contracture of the muscle groups on each side of the face.

Diagnosis of the existence of bilateral or unilateral muscle contracture is important in clinical procedures. Equal relaxation of the muscles on both sides of the face is an essential prerequisite to obtaining an even closure of the mandible to the occlusal position most favorable to the musculature. If, in adjusting occlusion, fitting dentures or fixed appliances, muscle spasm exists when the dentist registers the position of occlusion at which he fits the opposing teeth together, the mandible will be deviated because one side of the face is less mobile. The position of occlusion thus registered will be the result of uneven closure by musclature which is not evenly relaxed on both sides. If the position of occlusion is registered when muscle spasms exist, the muscles, from then on, will become excited and muscle spasms perpetuated each time the patient closes the teeth together in the deviated position. It is known that the degree of spasm in a muscle of a particular patient varies greatly at different times. If the muscle should either relax or spasm increase to any extent the teeth fitted by the dentist would no longer fit together properly at the position registered when the muscles were in a greater or lesser degree of spasm. It is the object of the dentist to provide an occlusal position that is the end point of even closure of the mandible. Undeviated closure of the mandible requires that the muscles of both sides of the face be at their resting length when closure begins. When the patient is in a normal upright eating position and the lower jaw is relaxed the muscles on both sides of the face, discounting any muscle xontracture, should be at their resting length. If the dentist registers an occlusal position reached by starting from the relaxed or resting length of the muscle the registered occlusal position will be one which encourages the maintainance of favorably relaxed facial and masticatory musculature. The dentist heretofore has not had any technique available to diagnose whether muscle is evenly relaxed on both sides of the face. It has been determined by use of the technique herein described that the muscles on each side of the face are very often in a state of spasm or contracture on one side or on both sides. The contracture is often a guard reaction to avoid pressure and subsequent discomfort in the presence of a sore tooth, a deflective premature contact or a sore spot under a denture.

The comparative degree of relaxation or contracture of the muscle groups on each side of the face is determined by measuring and comparing the threshold contraction of the muscles of both sides of the face. The threshold contraction is defined as the amount of current necessary to produce a slight twitch in the muscle. An electrical current of the same intensity is delivered simultaneously to the motor nerves that control the muscle groups of each side of the face as shown in FIG. 1. The comparative muscle response to each side of the face is observed or palpated. An equal response of muscle on each side of the face indicates an equal state of relaxation. If one side remains immobile at the threshold stimulus it indicates that the muscles of that side are in a state of spasm or contracture as compared to the muscles of the other side of the face. As shown in FIG. 2 the input electrodes emanate from a common terminal. Electrical pulses of predetermined duration and intensity are delivered to the input electrodes by a pulse generator. To insure that current flow from the input electrodes through the tissues of the nerves is bilaterally equal to positive pulse generator is disconnected and a 1.5-volt DC current applied across the electrodes. A 0 to 50 milliampere meter 28 is used to measure the current flow from each of the input electrodes 10 and 12 to the common dispersal electrode 14. If the needle remains relatively constant when the output selector knob 22 is moved from left to right or right to left the current input is equal on both sides. If the measurement varies it indicates that the current flow through one electrode is not exactly equal to the current flow on the opposite side. If one or both input electrodes are not in intimate contact with the skin the current flow through the electrodes out through the dispersal electrode may not be equal. The skin is cleansed prior to positioning of the input electrodes in order to remove skin oil, cosmetic makeup or other materials. An electrolyte solution is used to moisten the electrodes to insure good electrical contact with the skin.

If the response of muscle on each side of the face indicates an equal state of relaxation when a threshold stimulus is applied the dentist can then proceed to determine the myocentric or vertical position of occlusion as may be desired. If one side remains immobile at the threshold stimulus it may be necessary for the dentist to repetitively stimulate the muscle groups in contracture for a sufficient length of time to allow the muscle groups to relax to their resting length between each pulse. When an electrical stimulus is delivered to muscles that are in contracture or spasm, the stimulus produces first a latent heat and then heat of contraction as the muscles begin to contract. The muscles in contracture or spasm "warm up" and relax to their resting length between each pulse. The mandible then is at rest position. Each recurring stimulus is spaced far enough apart in time so that the muscle fibers of the muscle group shorten with a single contraction and then relax completely to rest position before the next succeeding stimulus arrives. With each single twitch of muscle the lower jaw or mandible closes from rest position to the position it reaches at the height of the twitch.

(2) A method of causing the mandible to close to the myocentric position of occlusion.

Myocentric occlusion is that position of occlusion to which the musculature would carry the mandible if no deflective areas existed on teeth or biterims and no shifting of bases occurred during closure from rest position to occlusion. The myocentric position of occlusion has heretofore been unobtainable in the presence of existing deflections. In the past the dentist has had to make decisions, based on assumptions which may or may not be correct, about the "centric" position of occlusion in the horizontal plane. The centric or habitual occlusion is not necessarily synonymous with myocentric occlusion. The centric occlusion may be a deviated position to which the mandible is guided by proprioception of existing obstructions or by muscles which are in a state of sustained guard or contraction on one or both sides, producing deviated closure of the mandible. To transform these decisions into an actual occlusal registration the dentist has, in the past, either manipulated the jaw or instructed the patient to close voluntarily, or made use of both procedures simultaneously. When the dentist manipulates the mandible to guide or force it to close into an occlusal position on which he has decided, he also has to decide where to place his hand and in what direction and how hard to press. Most dentists attempt to force the mandible to its most retruded position, which seldom coincides with the myocentric position of occlusion. This is done on the basis that, while it may not be in the position to which the jaw actually closes, it is at least a reference point and is somewhere (1 to 1½ millimeters) near the myocentric position of occlusion. Manipulation of the mandible by the dentist interferes with natural muscle relaxation or contraction, as muscles resist external force. Manipulation also lacks precise control of the amount or direction of pressure. The position to which the dentist forces the jaw by manipulation represents his arbitrary opinion and not the unhampered will of the musculature.

The alternative of manipulation by the dentist has been instruction to the patient to voluntarily close the mandible. This alternative is subject to deviation by an existing unilateral contracture or spasm, the presence of which the dentist has heretofore had no way of determining. The direction of voluntary closure is also influenced by proprioception of deflective areas on teeth or biterims or by shifting denture bases. As is known, all forms of voluntary muscular contractions are of tetanic nature and are not twitches or jerks. Voluntary contractions are due to the fact that the pyramidal cells of the cerebral cortex send out succesive volleys of impulses which are graded as to frequency and duration and which enter the muscle at a rate of 42 to 100 per second. It has been shown that the electromyographic activity of the masseter and temporal muscles involved in closure of the mandible continues for 25 to 60 milliseconds after initial contact of the teeth. During this time the mandible can be deviated by proprioception of any deflective areas, with the final position of the mandible not coinciding with deflection of the mandible to the terminal position of occlusion.

By contrast, in involuntary closure, during mastication, offset in electromyographic activity occurs immediately after initial contact is made. It has been shown that duration of contact produced by involuntary closure is considerably shorter than that produced by voluntary closure. Because of the nature of involuntary contraction and the short contact duration, proprioception does not influence the terminal contact position of the mandible as in voluntary closure.

By the method of this invention involuntary muscle contraction is accomplished and, because it is involuntary, the myocentric position of occlusion is easily determined.

(3) A method for determining the vertical position of occlusion for a particular patient.

When the mandible is at rest position a slight amount of space exists between the opposing teeth, i.e. the teeth are slightly apart. The exact amount of interocclusal clearance best for the particular patient has been rather vague and a matter of opinion. It is agreed, however, that some space must exist between the opposed teeth, otherwise the muscles would be under continual stretch with resulting constant pressure against the teeth. The exact amount of space, however, has been a matter of opinion but has been said to vary between 2 to 5 millimeters according to the individual. In making dentures the diagnosis as to whether the height of the teeth is within tolerable limits or just to what height the dentist should restore natural teeth if they are also worn, has been a mater of arbitrary decision by the dentist. If the jaw is overclosed the muscles are cramped and saliva may drain from the corners of the mouth and irritate them. Airways are also not maintained. The patient's jaw goes forward and closer to the nose, giving him an aged appearance. The present technique used by dentists to determine the interocclusal clearance or vertical position of occlusion has been to ask the patient to relax the jaw to the rest position and then to close as much further as the dentist estimates would be desirable. Criteria of closure have been vague at the most.

According to this invention an intermittent low frequency current is applied to the motor roots of the mandibular and facial nerves. Once the muscles are relaxed to their resting length by the technique previously mentioned they automatically close the mandible from the rest position to the height of the interocclusal space in accordance with the characteristic length of a single contraction of the closing muscles of that patient. The amount of closure from rest position to the vertical position of occlusion varies from patient to patient, depending on the length of their muscle fibers. To record the exact height of occlusion as determined by involuntary closure in response to the electric stimulus a soft impression material, such as wax or an autopolymerizing acrylic resin, is placed between the teeth. As the mandible closes to the height of the interocclusal space by the repetitive electrical stimulation, the teeth imprint themselves into the impression material which then hardens and is removed. From the impression material the height of the interocclusal space or vertical position of occlusion can easily be determined and recorded.

(4) A method of automatically taking denture impressions without manipulation of the tray or voluntary closure by the patient.

The conventional method used by dentists when making dentures is to first make an impression or a negative likeness of the denture areas of the jaw from which a cast of the region is produced. In taking the impression the dentist utilizes an impression tray of strong rigid material which conforms generally to the type and size of the denture region of the edentulous jaw. A plastic impression material is adapted to the configuration of the tray and the tray inserted into the the patient's mouth to make the impression. When taking impressions for dentures the dentist has had to decide where, in what direction and how hard to press against the tray in order to avoid tilting, movement, or excessive pressure which would displace and distort tissue. To mold the borders around the jaw the dentist has resorted to pulling and stretching of the surrounding musculature or asking the patient to pull down the lips while trying to hold the impression tray steady. Such manipulation lacks the precise control needed to make a correct and accurate denture impression. Some dentists have instructed the patient to close voluntarily and move the lips and cheeks; however, voluntary closure by the patient is at best subject to deviation by existing muscle spasms and by proprioception of deflective areas on biterims and by shifting of baseplates. Voluntary closure by an elderly or uncoordinated patient is even less certain.

Using the method of this invention the body of the impression and the borders are imprinted simultaneously by involuntary muscle contraction at the height of the interocclusal space. As described an electrical current is used to repetitively stimulate the mandibular and facial motor nerves which control closure of the lower jaw or mandible. In making impressions the following steps are generally employed. First a check is made to determine whether there are any existing spasms or contracture of the muscles of either or both sides of the face as described previously. If there are such contractures the electrical current is allowed to stimulate the muscles for a period of time ranging from 3 to 5 minutes or longer. This automatically relaxes the muscles in contracture to their resting length and allows the mandible to go to the rest position. Once the muscles are at their resting length the mandible repetitively closes from rest position to the height of the interocclusal space. Utilizing the electrical stimulus, the mandible closes repetitively from rest position through the interocclusal space to the horizontal and vertical position of occlusion. Biterims are added to the impression trays and are automatically imprinted at the horizontal and vertical myocentric positions. After the biterims have been built in the impression trays, the spacer is removed from the mandibular tray and replaced with impression material. At the height of the interocclusal space the muscles automatically take the impression against the supporting tissues without tissue or tray displacement. Surrounding muscles contract simultaneously and mold the impression borders. Occlusal contact is programmed to terminate so rapidly that deflection does not occur. The procedure is repeated as desired for maxillary impression. Once the impressions are made they are poured and the casts mounted directly on the articulator to the biterium recording. After mounting, the casts are removed from the articulator and the impressions separated. This procedure avoids incorporating base plate error into the articulator mounting.

Sometimes, because the teeth have been worn shorter, it is necessary to do an occlusal adjustment of ntaural dentition or of existing bridgework at an overclosed vertical height. If the interocclusal space is too great because of worn down teeth it may be necessary to stimulate overclosure of the mandible to obtain a correct recording at the height at which the teeth occlude. In the physiology of nerve stimulation it is known that there exists an absolute refractory period of about 1 millisecond in which, after stimulation, it is impossible to restimulate the nerve. After the absolute refractory period there exists a relative refractory period of approximately 15 milliseconds in which the nerve recovers conductivity. This relative refractory period is followed by a supernormal period during which the nerve is most excitable. Muscle, once stimulated, also has a refractory period which terminates before the muscle is fully relaxed. If the muscle is again stimulated before it is completely relaxed but after the refractory period, tetany results, causing the muscle to shorten. By continuously stimulating the masticatory and facial muscles through the motor roots of the facial and mandibular nerves before the muscles are fully relaxed and after their refractory period, overclosure of the mandible can be induced. To accomplish this it is necessary to change the frequentcy of the electrical stimuli delivered through the input electrodes to the facial and mandibular nerves. As previously mentioned the pulse normally used to cause the mandible to close is about 40 pulses/minute, the pulses having a duration of about 2 milliseconds. To cause overclosure the frequency is increased to about 110 pulses/minute. By stimulating the muscles with a shower of stimuli rather than a single stimulus the muscles contract further before they have a chance to relax fully. The mandible overcloses allowing the dentist to register with wax, carbon paper or similar materials the tooth areas or points that first contact when the teeth occlude.

The method of producing a muscularly balanced closure of the mandible by simultaneously and evenly stimulating the motor roots of the mandibular and facial nerves on both sides of the face has been described with reference to several techniques useful to the dentist. The method can also be used in a number of other applications such as in the treatment of Temporomandibular Joint Syndrome and in reduction of swelling or discoloration after surgical operations or accidental injury.

The embodiments of the invention in which a particular property or privilege claimed are as follows:

1. A method of closing the human mandible, comprising:

placing input electrodes on both sides of the face in a position to simultaneously and bilaterally stimulate [the motor roots of the mandibular and facial] *a multiplicity of the muscles that are innervated by the fifth and seventh cranial nerves,* placing a dispersal electrode in a predetermined location on the human body, passing an electrical current of sufficient intensity through the input electrodes to stimulate [the motor roots of the mandibular and facial] *a multiplicity of the muscles that are innervated by the fifth and seventh cranial* nerves through the skin [stimulation of the nerves] resulting in coordinated contraction of the [masticatory and facial] muscles.

2. The method of claim 1 wherein the input electrodes are placed over the mandibular notch and forward of the lower lobe of the ear and in intimate contact with the skin.

3. The method of claim 1 wherein an electrical current of equal intensity is simultaneously delivered to each input electrode.

4. The method of claim 3 wherein the electrical current is of a duration approximating natural nerve stimuli and is pulsed at a rate for stimulation of the muscle complex [through the motor nerves] repeatedly without exhaustion.

5. The method of claim 4 wherein the electrical current is pulsed at about 40 pulses/minute.

6. The method of claim 1 wherein the electrical current is pulsed at a frequency to stimulate the muscle complex prior to full relaxation thereof, thereby inducing overclosure of the mandible.

7. The method of claim 1 including measuring and comparing the threshold contraction of the muscle complex of the mandible on each side of the face to determine the degree of relaxation or contracture of the muscle groups of each side of the face and adjusting the electrical current input to each of the input electrodes to produce substantially equal contraction of the muscle groups of each side of the face.

8. The method of claim 1 wherein the mandible closes to the myocentric and vertical positions of occlusion.

9. A method of involuntary closing the human mandible for various clinical objectives, comprising:

simultaneously bilaterally and electrically stimulating [the motor roots of the mandibular and facial] *a multiplicity of the muscles that are innervated by the fifth and seventh cranial* nerves on both sides of the face, [stimulation of the nerves] resulting in coordinated contraction of the [masticatory and facial] muscles.

10. The method of claim 9 wherein [the mandibular and facial nerves are simultaneously stimulated by] electrical currents of equal intensity *are delivered to both sides of the face.*

11. A method of taking impressions for dentures utilizing involuntary closure of the mandible to imprint an impression material comprising:

providing an impression material over the denture areas of the jaw, and electrically stimulating [the motor roots of the mandibular and facial] *a multiplicity of the muscles that are innervated by the fifth and seventh cranial* nerves on both sides of the face simultaneously with *an* electrical *current* [currents of equal intensity stimulation of the nerves] resulting in coordinated contraction of the muscle groups controlling opening and closing of the mandible.

12. The method of claim 11 wherein the electrical currents are delivered through input electrodes placed on both sides of the face and in intimate contact with the skin.

13. The method of claim 12 wherein the input electrodes are placed over each mandibular notch and forward of the lower lobe of each ear.

14. The method of claim 11 wherein, prior to imprinting the impression material by involuntary closure, muscle groups in contracture or spasm are relaxed to their resting length by repetitively stimulating by an electrical current the muscle groups [through the motor roots of the mandibular and facial] *innervated by the fifth and seventh cranial nerves.*

15. The method of claim 11 wherein electrical stimulation [of the motor roots of the mandibular and facial nerves] results in simultaneous molding and imprinting of the impression borders.

16. The method of claim 1 wherein, prior to passing an electrical current through the input electrodes, placing a marking material between the teeth whereby contraction of the muscles results in registry of initial contact of the opposed teeth on occlusion.

17. The method of claim 1 wherein, prior to passing an electrical current through the input electrodes, providing an impression material between the teeth so that contraction of the muscles closes the mandible to the height of the interocclusal space and imprints the teeth into the impression material to record the height of the interocclusal space.

References Cited

The following references, cited by the Examiner, are of record in the patented file of this patent or the original patent.

UNITED STATES PATENTS 3,279,468 11/1966 Le Vine ---------- 128—410

FOREIGN PATENTS 2,004,461 11/1969 France ---------- 128—2.1 R

ROBERT PESHOCK, Primary Examiner